United States Patent [19]
Nakano

[11] Patent Number: 5,067,360
[45] Date of Patent: Nov. 26, 1991

[54] TOROIDAL CONTINUOUSLY VARIABLE TRANSMISSION

[75] Inventor: Masaki Nakano, Kawasaki, Japan

[73] Assignee: Nissan Motor Co., Ltd., Yokohama, Japan

[21] Appl. No.: 586,084

[22] Filed: Sep. 21, 1990

[30] Foreign Application Priority Data

Sep. 26, 1989 [JP] Japan .................................. 1-249889

[51] Int. Cl.⁵ .......................................... F16H 15/08
[52] U.S. Cl. ................................... 74/200; 74/190.5; 475/185
[58] Field of Search ..................... 74/190, 190.5, 200; 475/183, 185

[56] References Cited

U.S. PATENT DOCUMENTS

| | | | |
|---|---|---|---|
| 4,453,427 | 6/1984 | Kraus et al. ........................... | 74/200 |
| 4,893,517 | 1/1990 | Nakano ................................ | 74/200 |
| 4,928,542 | 5/1990 | Nakano ................................ | 74/200 |
| 4,968,289 | 11/1990 | Nakano ................................ | 475/185 |

FOREIGN PATENT DOCUMENTS

| | | | |
|---|---|---|---|
| 2541407 | 8/1984 | France .................................. | 74/200 |
| 58-200844 | 11/1983 | Japan ................................... | 74/200 |
| 1-234646 | 9/1989 | Japan ................................... | 74/200 |

Primary Examiner—Leslie A. Braun
Assistant Examiner—David W. Laub
Attorney, Agent, or Firm—Foley & Lardner

[57] ABSTRACT

A toroidal continuously variable transmission has first coaxial toric input and output elements arranged opposite each other such that a first toric cavity is formed therebetween, and second coaxial toric input and output elements opposite each other such that a second toric cavity is formed therebetween. The first and second output discs are arranged between the first and second input discs. First traction rollers are disposed in the first toric cavity for the transmission of motion therebetween. Second traction rollers are disposed in the second toric cavity for the transmission of motion therebetween. Tensions sheets extend between and interconnect roller support structures for the first and second traction rollers. The tension sheets include a first tension sheet extending between and interconnecting the roller support structures for the first traction rollers, and a second tension sheet extending between and interconnecting the roller support structures for the second traction rollers. The first and second tension sheets each having a central portion and a guide structure associated therewith in the central portion thereof. Each of the guide structures includes a guide block. The guide blocks are not mounted directly to the transmission housing. A guide block support member is integral with the guide blocks and is mounted to the transmission housing for balancing forces applied to the guide blocks.

9 Claims, 5 Drawing Sheets

FIG.6

TOROIDAL CONTINUOUSLY VARIABLE TRANSMISSION

BACKGROUND OF THE INVENTION

The present invention relates to a toroidal continuously variable transmission in which two sets of motion transmitting traction rollers each are disposed between and in engagement with opposite toric elements rotatably supported in the transmission housing.

The toroidal continuously variable transmissions of the above kind are disclosed in U.S. Pat. No. 4,928,542 issued on May 29, 1990; U.S. Pat. No. 4,893,517 issued on Jan. 16, 1990; and the following copending U.S. applications and EP applications. They include U.S. Pat. Appln. Ser. No. 07/316,944 filed on Feb. 28, 1989, now U.S. Pat. No. 4,968,289 U.S. Pat. Appln. Ser. No. 07/450,303 filed on Dec. 14, 1989 (=EP Appln. No. 89123151.6 filed on Dec. 14, 1989); U.S. Pat. Appln. Ser. No. 07/450,326 filed on Dec. 14, 1989 (=EP Appln. No. 89123149.0 filed on Dec. 14, 1989); and U.S. Pat. Appln. Ser. No. 07/448,194 filed on Dec. 14, 1989 (=EP Appln. No. 89123150.8 filed on Dec. 14, 1989.

In these known toroidal continuously variable transmissions, two sets of toric discs are coaxial and rotatably supported in the transmission housing such that the output toric discs are disposed between the two input toric discs which are interconnected to receive an input torque. To enable such toroidal continuously varible transmission to transmit torque, engagement forces between the input and output toric discs of each set and the traction rollers are necessary, which forces are obtained by forcing the toric discs of each set toward each other and into firm engagement with the traction rollers therebetween. The engagement forces depend on, and are generated by, the torque transmitted through the transmissions. This, however, results in a large axial thrust load of the traction rollers and the support structures for the rollers.

Opposite roller support structures for the rollers of each set have been interconnected by tension sheets which take up the opposing forces applied to the traction rollers during operation of the transmission. Each of the tension sheets has a central portion between the associated roller support structures and a guide structure associated with the central portion thereof. Each of the guide structures includes a guide block, and some of the guide blocks have been fixedly secured to the transmission housing. This arrangement prevents excessive vibration from being transmitted to the transmission housing as the tension sheets balance the forces. For withstanding the axial thrust load applied to the guide blocks, at least those portions of the transmission housing to which the guide blocks are fixedly secured ought to have a sufficiently high rigidity. This, however, results in a transmission housing with increased thickness or a transmission housing with a reinforcement rib structure.

An object of the present invention is to provide a toroidal continuously variable transmission in which it is avoided that the transmission housing needs carry the load which some or each of the guide blocks are subject to.

SUMMARY OF THE INVENTION

In a toroidal continuously variable transmission, two sets of coaxial input and output toric elements with traction rollers disposed therebetween are arranged such that the output toric elements are disposed between the input toric elements, and tension sheets for roller support structures balance forces applied to the traction rollers. Among the tension sheets, a first tension sheet extends between and interconnects roller support structures for the traction rollers disposed between the toric elements of one set, while a second tension sheet extends between and interconnects roller support structures for the traction rollers disposed between the toric elements of the other set. Each of the first and second tension sheets has a central portion and a guide structure associated therewith in the central portion thereof and each of the guide structures includes a guide block. A guide block support member is mounted to the transmission housing and interconnects the guide blocks of the guide structures associated with the first and second tension sheets for balancing forces applied to the guide blocks interconnected thereby. This arrangement prevents the forces applied to these guide blocks from being transmitted to the transmission housing since the guide block support member balances the forces.

DETAILED DESCRIPTION OF THE PREFERRED EMBODIMENT OF THE INVENTION

For description of the detail of a toroidal continuously variable transmission of the type with which the present invention is concerned and for a description of its operation, reference is made to U.S. Pat. No. 4,893,517 issued to the Applicant, Masaki NAKANO, on Jan. 16, 1990, the subject matter of which is hereby incorporated by reference.

Figure 1:
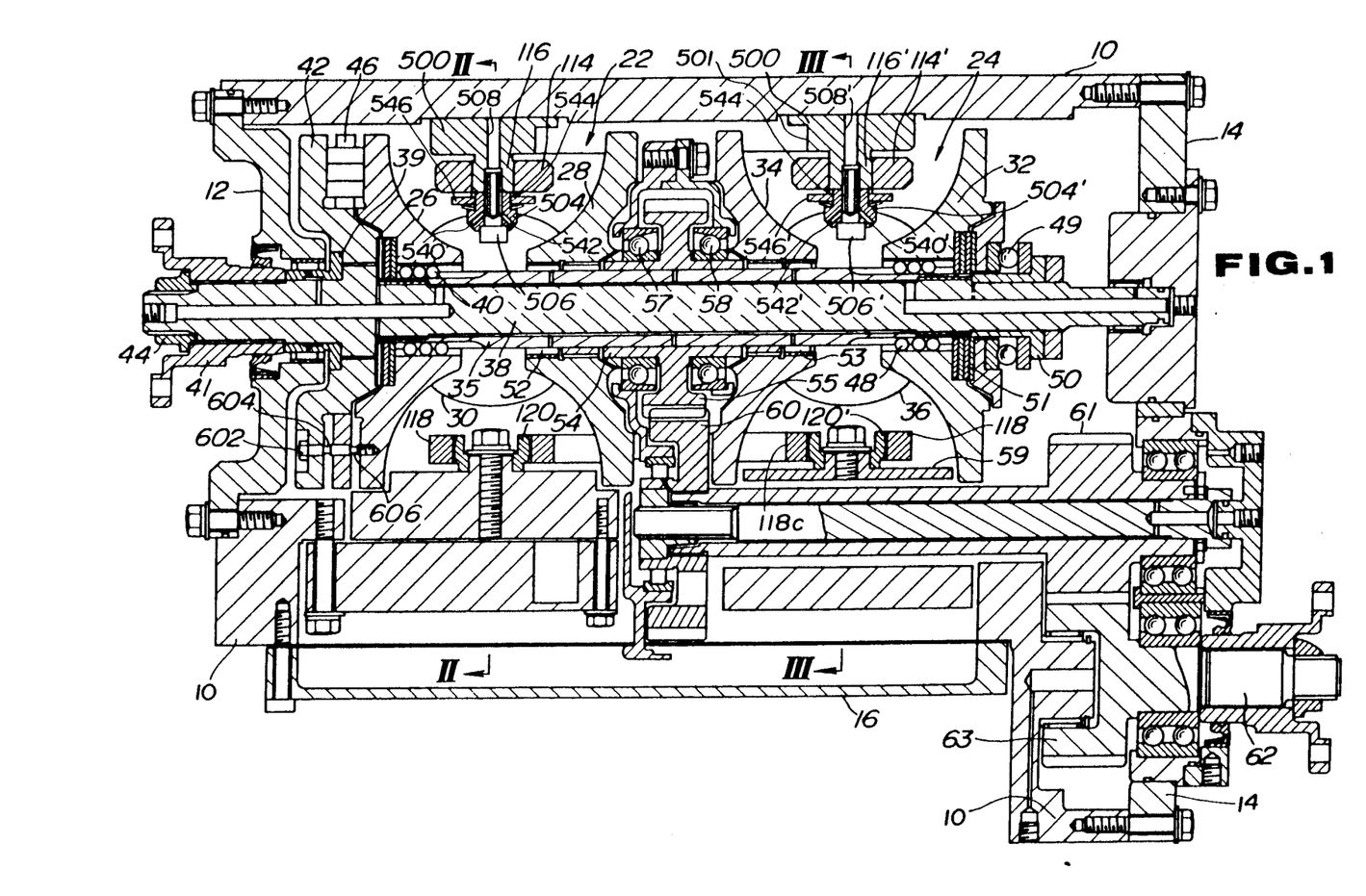
FIG. 1 is an axial cross section taken along the axis of an input shaft showing the arrangement of the elements of a toroidal continuously variable transmission.
Figure 2:
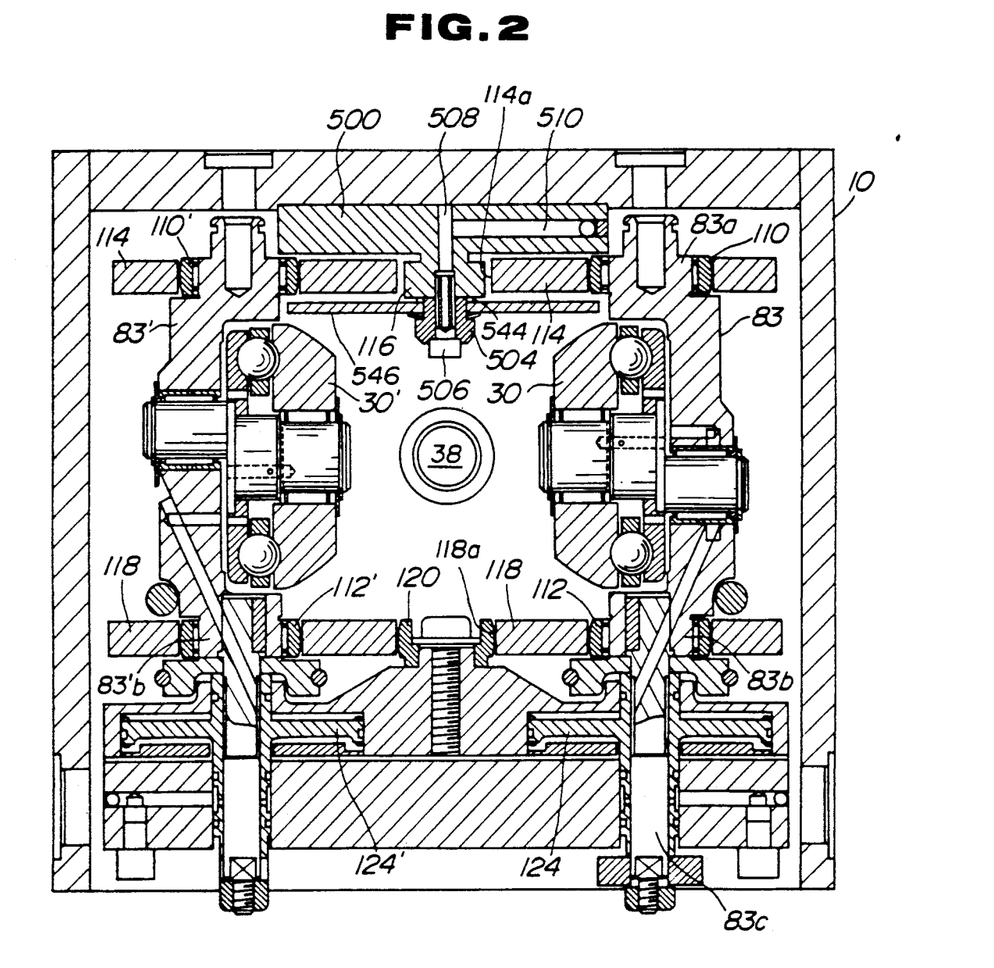
FIG. 2 is a cross section, slightly enlarged, taken along the line II—II of FIG. 1.
Figure 3:
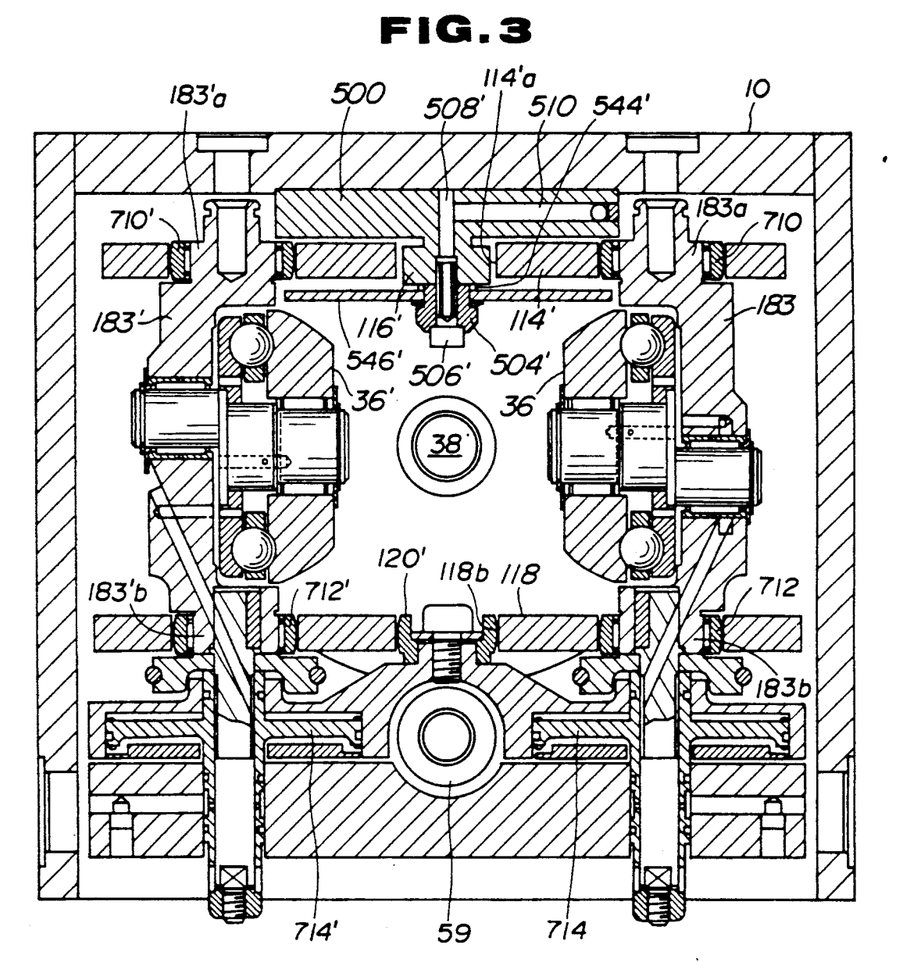
FIG. 3 is a cross section, slightly enlarged, taken along the line III—III of FIG. 1.
Figure 6:
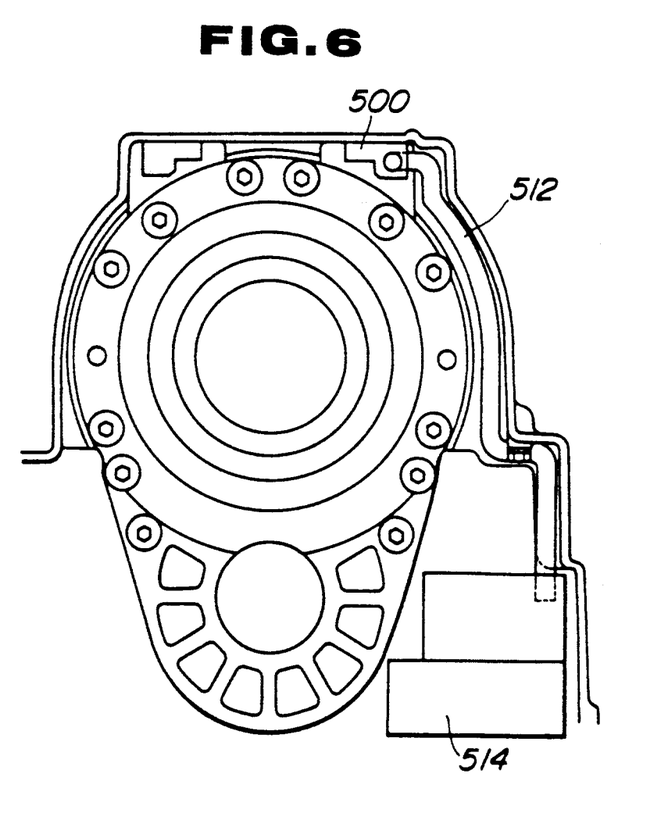
FIG. 6 is a cross section, slightly reduced, taken along the line VI—VI of FIG. 4, showing arrangement of the transmission elements including a control valve assembly and a gear housing.

As shown in FIGS. 1, 2 and 3, such a toroidal continuously variable transmission comprises a housing 10 in which first traction rollers 30 and 30' are disposed between, and in engagement with, a first set of toroidal input and output discs 26 and 28 which are rotatably supported in the housing 10, while second traction rollers 36 and 36' are disposed betwen, and in engagement with, a second set of input and output toroidal discs 32 and 34 which are rotatably supported in the housing 10. The arrangement is such that the output toroidal discs 28 and 34 are disposed between the input toroidal discs 26 and 32. The output toroidal discs 28 and 34 are rotatably supported by needle bearings 52 and 53 on a sleeve shaft 35 that is rotatably supported on an input shaft 38. The output discs 28 and 34 are splined to a sleeve extension 54 of a driver gear 55 which is rotatably supported by ball bearings 57 and 58 on a gear housing fixedly secured to the transmission housing 10. The profile of the gear housing is best seen in FIG. 6. The input discs 26 and 32 are supported on the sleeve shaft 35 by means of ball splines 40 and 48 so that they can rotate with the sleeve shaft 35. The input toroidal discs 26 and 32 are forced toward the output toroidal discs 28 and 34, respectively, with a force depending on the torque transmitted to the input shaft 38 of the transmission. As viewed in FIG. 1, the input shaft 38 has a righthand end supported by a bearing structure fixedly supported by a rear end flange 14 which is fixedly secured to the transmission housing 10 to close one open end thereof, and extends through and supported by another bearing structure fixedly supported by a front end flange 12 which is fixedly secured to the transmission housing 10 to close the opposite open end thereof. The lefthand end of the input shaft 38 is disposed outside the transmission housing 10 and fixedly supports a ring 41 which is axially fit owing to a lock nut 44. The input shaft 38 is drivingly connected to a turbine shaft of a torque converter whose impeller is connected to an engine.

In order to force the input toroidal discs 26 and 32 toward the respective output toroidal discs 28 and 34, a first loading arrangement 42 and 46 is separatively disposed between the input shaft 38 and the input toroidal disc 38, and a second loading arrangement 49, 50 and 51 is opeatively disposed between the input shaft 38 and the input toroidal disc 32. The first loading arrangement includes a cam flange 42 which is splined to the input shaft 38 and positioned in an axial fit manner owing to a flanged sleeve 39, ring 41 and lock nut 44. A cam roller 46 is disposed between and in engagement with opposing cam surfaces of the cam flange 42 and the input toroidal disc 42. The second loading arrangement includes a loading nut 50 fixedly supported in axial fit manner on the input shaft 38, a thrust ball bearing 49 and a bellevile spring 51. Owing to loading arrangements, the input toroidal disc 26 is forced toward the output toroidal disc 28 with a force depending on the torque applied to the input shaft 38, and the input toroidal disc 32 is forced toward the output toroidal disc 34 as the reaction on the input shaft 38 is transmitted to the input toroidal disc 32 by the loading nut 50, thrust ball bearing and bellevile spring 51. For a description of these loading arrangements and for a description of their operation, reference is made to copending U.S. Pat. Appln. Ser. No. 07/450,326 filed by the Applicant on Dec. 14, 1989 or the corresponding EP Appln. No. 89123149.0 filed on Dec. 14, 1989, the subject matter of which is incorporated herein by reference.

Figure 4:
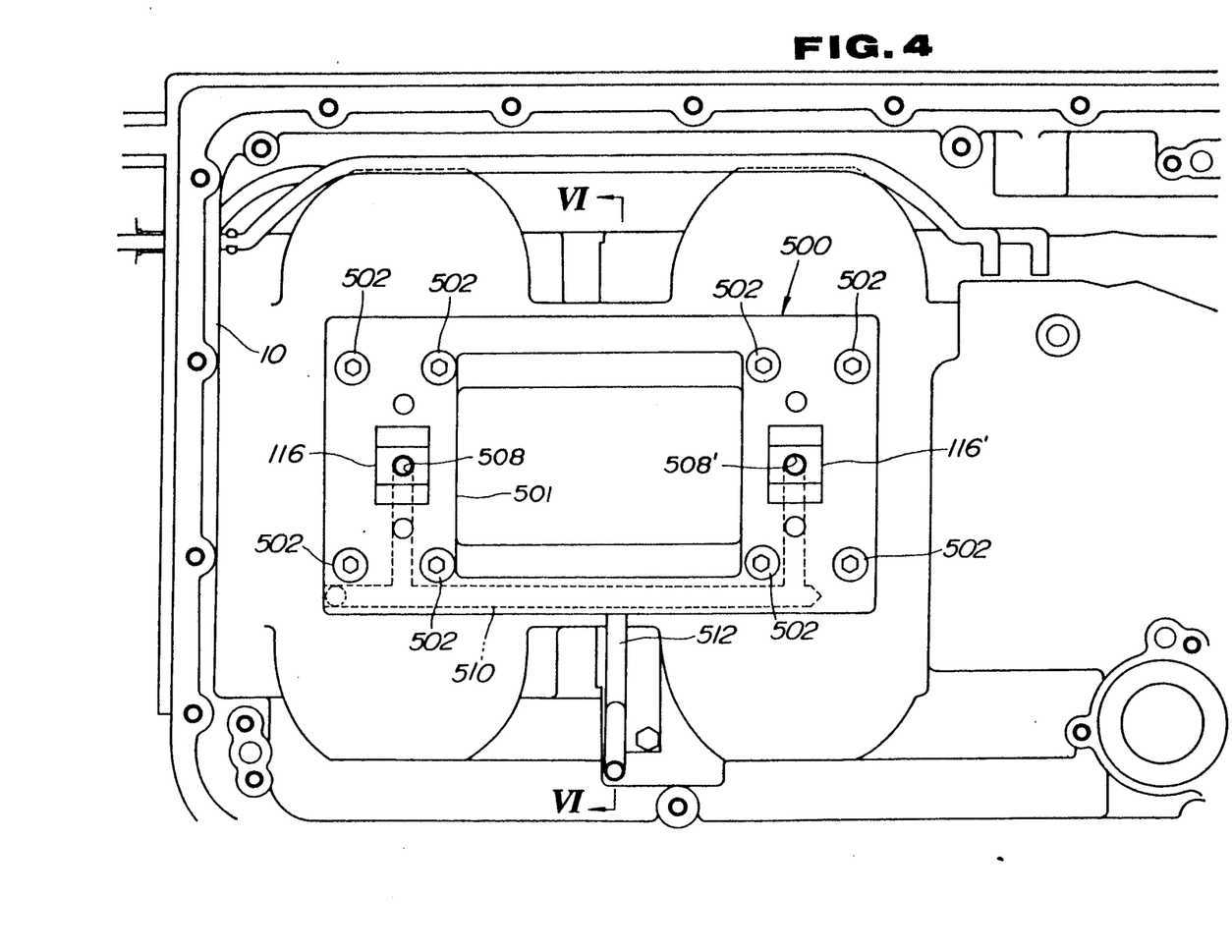
FIG. 4 is a plan view of a guide block support member assembled with the transmission housing.
Figure 5:
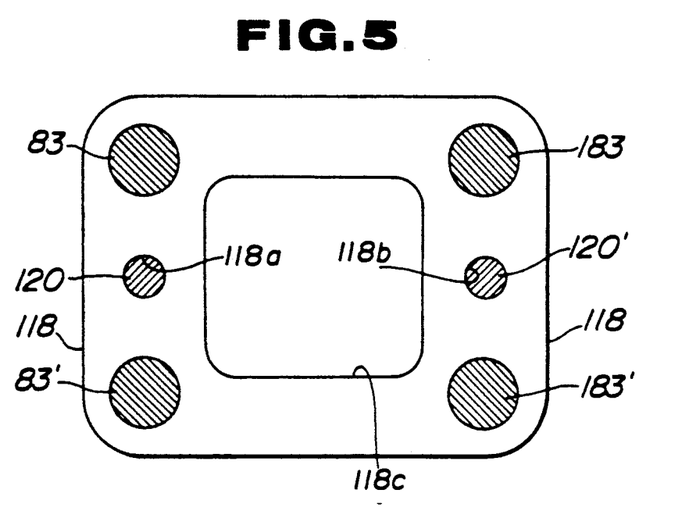
FIG. 5 is a plan view of a third tension sheet.

The traction rollers 30, 30', 36 and 36' are subject to axial thrust loads during operation of the transmission. The traction rollers 30 and 30' are rotatably supported by roller support structures 83 and 83' as best seen in FIG. 2, while the traction rollers 36 and 36' are rotatably supported by roller support structures 183 and 183' as best seen in FIG. 3. The roller support structures 83 and 83' are pivotally supported by means of beaings 110 and 110' on a first tension sheet 114, the roller support structures are pivotally supported by like bearings 710 and 710' on a second tension sheet 114', and all of the roller structures are pivotally supported by means of bearings 112, 112', 712 and 712' on a third tension sheet 118. The plan view of the third tension sheet 118 is seen in FIG. 5. The first and third tension sheet 114 and 118 balance radial forces between the opposite roller support structures 83 and 83', while the second tension sheet 114' and the third tension sheet 118 balance radial forces between the opposite roller support structures 183 and 183'. The third tension sheet 118 is common to all of the roller support structures 83, 83', 183 and 183'. The first and third tension sheets 114 and 118 have in the center between the roller support structures 83 and 83' openings 114a and 118a which receive tension sheet guide blocks 116 and 120, while the second and third tension sheets 114' and 118 have in the center between the roller support structures 183 and 183' openings 114'a and 118b which receive tension sheet guide blocks 116' and 120'. As best seen in FIG. 5, the third tension sheet 118 has a window 118c which receives the output toroidal discs 28 and 34 so as to avoid interference with them. The tension sheet guide blocks 120 and 120' for the third tension sheet 118 are fixed relative to the housing 10 by means of bolts. The tension sheet guide block 116 and 116' for the first and second tension sheets 114 and 114' are integral with a guide block support member 500 which balances axial forces applied to the guide blocks 116 and 116'. As best seen in FIG. 4, the guide block support member 500 is fixedly secured to the adjacent top wall of the housing 10 by means of bolts 502 and has a window 501 which receives the output toroidal discs 28 and 34 to avoid interference with them.

In order to supply traction oil into traction cavities between the toroidal discs 26 and 28 and between the toroidal discs 32 and 34, the tension guide blocks 116 and 116' of the guide block support member 500 have bores 508 and 508' (see FIG. 1) which are interconnected by a common passage 510 extending through the guide block support member 500 as shown in FIG. 4. As seen in FIGS. 4 and 6, a pipe 512 extends between and interconnects the common passage 510 and a control valve assembly 514 which is secured to the transmission housing 10. Referring to FIG. 1, the oil supplied to the bores 508 and 508' flows through passages 540, 542; 540' and 542' of spouts 504 and 504' to gush into the respective toroidal cavities. The spout 504 is attached to the tension guide block 116 by a bolt 506 and a jam nut 544. A stop member 546 is interposed between the jam nut 544 and the spout 504. The spout 504' is attached to the tension guide block 116' by a bolt 506' and a jam nut 544'. A stop member 546' is interposed between the jam nut 544 and the spout 504. The spout passages 540 and 542 communicate with the bore 508, and the spout passages 540' and 542' communicate with the bore 508'.

Preferably, the toroidal continuously variable transmission is, during operation, so arranged that the roller support structures are in a vertial position such that the first and second tension sheets 114 and 114' are at the top and the third tension sheet 118 is at the bottom of the transmission.

As shown in FIG. 1, a location pin 602 extends through the cam flange 42 and cam roller 46 into the input toroidal disc 26 for facilitating assembly. This location pin 602 is left inserted after the assembly since it is formed with two waist portions 604 and 606 which are smaller in diameter than the remaining portion and thus easy to be broken into pieces when the waist portions 604 and 606 are subject to shear stress. In this example, the location pin 602 has two waist portions 604 and 606. Alternatively, a location pin made of plastics may be used.

As shown in FIGS. 2 and 3, the traction rollers 30 and 30' are disposed in the toroidal cavity in radial symmetry with respect to an axis of the input shaft 38, and the traction rollers 36 and 36' are disposed in the toroidal cavity in radial symmetry with respect to the axis of the input shaft 38. Referring to FIG. 2, the roller support structures 83 and 83' have upper trunnions 83a and 83'a supported by the bearings 110 and 110' on the first tension sheet 114, and lower trunnions 83b and 83'b supported by the bearings 112 and 112' on the third tension sheet 118. Referring to FIG. 3, the roller support structures 183 and 183' have upper trunnions 183a and 183'a supported by the bearings 710 and 710' on the second tension sheet 114', and lower trunnions 183b and 183'b supported by bearings 712 and 712' on the third tension sheet 118. These roller support structures 83, 83', 183 and 183' are vertically moveable by hydraulic motors, each including a hydraulic piston, 124, 124', 714 and 714'. For a desciption of the details of operation of hydraulic motors of the type shown in FIGS. 2 and 3, reference is made to copending U.S. Pat. Appln. Ser. No. 07/448,194 filed by the Applicant on Dec. 14, 1989 or the corresponding EP Appln. No. 89123150.8 filed on Dec. 14, 1989, the subject matter of which is incorporated herein by reference.

Referring back to FIG. 1, the driver gear 55 in in mesh with a follower gear 60 splined to an intermediate shaft 59 at one end portion thereof. The intermediate shaft 59 is integral with a gear 61 which is in mesh with a gear 63 integral with an output shaft 62.

With the guide block support member 500, no force is transmitted to the top wall of the housing 10 since the opposing axial forces applied to the guide blocks 116 and 116' are balanced. With the third tension sheet 118 extending between and interconnecting the guide blocks 120 and 120', the opposing axial forces are balanced.

Owing to these arrangements, it is no longer necessary to increase the thickness of the top wall of the transmission housing nor to reinforce the top wall of the housing with a rib structure. Thus, it is now possible to use a transmission housing made of aluminimum which is light in weight.

What is claimed is:

1. A toroidal continuously variable transmission comprising:
    a housing;
    first coaxial input and output toric elements rotatably supported in said housing and being arranged opposite each other such that a first toric cavity is formed therebetween;
    second coaxial input and output toric elements rotatably supported in said housing and being arranged opposite each other such that a second toric cavity is formed therebetween;
    said first and second input and output toric elements being coaxial and rotatable about an axis and arranged such that said first and second output toric elements are disposed between said first and second input toric elements;
    first motion transmitting traction rollers, disposed in said first toric cavity in radial symmetry with respect to said axis and in engagement with said opposite first input and output toric elements, for the transmission of motion therebetween;
    second motion transmitting traction rollers, disposed in said second toric cavity in radial symmetry with respect to said axis and in engagement with said opposite second input and output toric elements, for the transmission of motion therebetween;
    a first roller support structure for each of said first motion transmitting traction rollers;
    a second roller support structure for each of said first motion transmitting traction rollers;
    tension sheets for said first and second roller support structures for balancing forces applied to said first and second motion transmitting traction rollers, said tension sheets including a first tension sheet extending between and interconnecting said first roller support structures, and a second tension sheet extending between and interconnecting said second roller support structures, said first and second tension sheets each having a central portion and a guide structure associated therewith in said central portion thereof, each of said guide structures including a guide block; and
    a guide block support member, mounted to said housing and interconnecting said guide blocks of said guide structures associated with said first and second tension sheets, for balancing forces applied to said guide blocks integrally interconnected thereby.

2. A toroidal continuously variable transmission comprising:
    a housing;
    first coaxial input and output toric elements rotatably supported in said housing and being arranged opposite each other such that a first toric cavity is formed therebetween;
    second coaxial input and output toric elements rotatably supported in said housing and being arranged opposite each other such that a second toric cavity is formed therebetween;
    said first and second input and output toric elements being coaxial and rotatable about an axis and arranged such that said first and second output toric elements are disposed between said first and second input toric elements;
    first motion transmitting traction rollers, disposed in said first toric cavity in radial symmetry with respect to said axis and in engagement with said opposite first input and output toric elements, for the transmission of motion therebetween;
    second motion transmitting traction rollers, disposed in said second toric cavity in radial symmetry with respect to said axis and in engagement with said opposite second input and output toric elements, for the transmission of motion therebetween;
    a first roller support structure for each of said first motion transmitting traction rollers;
    a second roller support structure for each of said first motion transmitting traction rollers;
    tension sheets for said first and second roller support structures for balancing forces applied to said first and second motion transmitting traction rollers, said tension sheets including a first tension sheet extending between and interconnecting said first roller support structures, and a second tension sheet extending between and interconnecting said second roller support structures, said first and second tension sheets each having a central portion and a guide structure associated therewith in said central portion thereof, each of said guide structures including a guide block;
    wherein said tension sheets include a third tension sheet extending between and interconnecting said first and second roller support structures, said third tension sheet having two axially spaced portions and guide structures associated therewith in said two axially spaced portions, respectively; and
    a guide block support member, mounted to said housing and interconnecting said guide blocks of said guide structures associated with said first and second tension sheets, for balancing forces applied to said guide blocks integrally interconnected thereby.

3. A toroidal continuously variable transmission comprising:

a housing;

first coaxial input and output toric elements rotatably supported in said housing and being arranged opposite each other such that a first toric cavity is formed therebetween;

second coaxial input and output toric elements rotatably supported in said housing and being arranged opposite each other such that a second toric cavity is formed therebetween;

said first and second input and output toric elements being coaxial and rotatable about an axis and arranged such that said first and second output toric elements are disposed between said first and second input toric elements;

first motion transmitting traction rollers, disposed in said first toric cavity in radial symmetry with respect to said axis and in engagement with said opposite first input and output toric elements, for the transmission of motion therebetween;

second motion transmitting traction rollers, disposed in said second toric cavity in radial symmetry with respect to said axis and in engagement with said opposite second input and output toric elements, for the transmission of motion therebetween;

a first roller support structure for each of said first motion transmitting traction rollers;

a second roller support structure for each of said first motion transmitting traction rollers;

tension sheets for said first and second roller support structures for balancing forces applied to said first and second motion transmitting traction rollers, said tension sheets including a first tension sheet extending between and interconnecting said first roller support structures, and a second tension sheet extending between and interconnecting said second roller support structures, said first and second tension sheets each having a central portion and a guide structure associated therewith in said central portion thereof, each of said guide structures including a guide block; and a guide block support member, mounted to said housing and interconnecting said guide blocks of said guide structures associated with said first and second tension sheets, for balancing forces applied to said guide blocks integrally interconnected thereby;

wherein said guide block support member has a window receiving said first and second toric elements.

4. A toroidal continuously variable transmission as claimed in claim 2, wherein said guide structures associated with said third tension sheet are mounted to said housing.

5. A toroidal continuously variable transmission as claimed in claim 2, wherein said third tension sheet has a window receiving said first and second output toric elements.

6. A toroidal continuously variable transmission comprising:

a housing;

first coaxial input and output toric elements rotatably supported in said housing and being arranged opposite each other such that a first toric cavity is formed therebetween;

second coaxial input and output toric elements rotatably supported in said housing and being arranged opposite each other such that a second toric cavity is formed therebetween;

said first and second input and output toric elements being coaxial and rotatable about an axis and arranged such that said first and second output toric elements are disposed between said first and second input toric elements;

first motion transmitting traction rollers, disposed in said first toric cavity in radial symmetry with respect to said axis and in engagement with said opposite first input and output toric elements, for the transmission of motion therebetween;

second motion transmitting traction rollers, disposed in said second toric cavity in radial symmetry with respect to said axis and in engagement with said opposite second input and output toric elements, for the transmission of motion therebetween;

a first roller support structure for each of said first motion transmitting traction rollers;

a second roller support structure for each of said first motion transmitting traction rollers;

tension sheets for said first and second roller support structures for balancing forces applied to said first and second motion transmitting traction rollers, said tension sheets including a first tension sheet extending between and interconnecting said first roller support structures, and a second tension sheet extending between and interconnecting said second roller support structures, said first and second tension sheets each having a central portion and a guide structure associated therewith in said central portion thereof, each of said guide structures including a guide block; and a guide block support member, mounted to said housing and interconnecting said guide blocks of said guide structures associated with said first and second tension sheets, for balancing forces applied to said guide blocks integrally interconnected thereby;

wherein said guide blocks have respective bores; and wherein said guide block support member has a common passage extending between and interconnecting said bores.

7. A toroidal continuously variable transmission as claimed in claim 6, further comprising a control valve assembly mounted to said transmission housing and a pipe interconnecting said control valve assembly and said common passage of said guide block support member.

8. A toroidal continuously variable transmission as claimed in claim 7, wherein said guide block support member has spouts each connected to one of said guide blocks thereof, each of said spouts having a plurality of passages communicating with said bore of the associated guide block.

9. A toroidal continuously variable transmission as claimed in claim 2, wherein said transmission is set up for operation in a position in which said first and second traction roller support structures extend vertically and said first, second, and third tension sheets extend horizontally with said first and second tension sheets disposed above said third tension sheet, and wherein said first roller support structures have upper trunnions disposed in bearing structures supported in openings in the end portions of said first tension sheet and lower trunnions disposed in bearing structures supported in openings of said third tension sheet, and said second roller support structures have upper trunnions disposed in bearing structures supported in openings in the end portions of said second tension sheet and lower trunnions disposed in bearing structures supported in openings of said third tension sheet.

* * * * *